(12) United States Patent
Hancasky et al.

(10) Patent No.: US 9,475,479 B2
(45) Date of Patent: Oct. 25, 2016

(54) ELECTRIFIED VEHICLE NEUTRAL ENGINE START

(71) Applicant: FORD GLOBAL TECHNOLOGIES, LLC, Dearborn, MI (US)

(72) Inventors: Robert David Hancasky, Royal Oak, MI (US); Bader M. Badreddine, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 239 days.

(21) Appl. No.: 14/264,117

(22) Filed: Apr. 29, 2014

(65) Prior Publication Data

US 2015/0307079 A1    Oct. 29, 2015

(51) Int. Cl.
*B60W 10/06*    (2006.01)
*B60W 10/18*    (2012.01)

(52) U.S. Cl.
CPC ............ *B60W 10/182* (2013.01); *B60W 10/06* (2013.01); *B60W 2510/244* (2013.01); *B60W 2520/04* (2013.01); *B60W 2710/06* (2013.01); *B60W 2710/186* (2013.01); *Y10S 903/93* (2013.01)

(58) Field of Classification Search
CPC ........... B60W 10/182; B60W 10/192; B60W 2510/244; B60W 2520/04; B60W 2710/186; Y10T 477/80; Y10T 477/81; Y10T 477/86; Y10T 477/865
See application file for complete search history.

(56) References Cited

U.S. PATENT DOCUMENTS

| | | | |
|---|---|---|---|
| 5,081,365 A * | 1/1992 | Field | B60K 6/48 290/45 |
| 6,384,490 B1 * | 5/2002 | Birzl | F02N 11/10 307/10.1 |
| 7,702,451 B1 * | 4/2010 | Crossley | F02N 11/0811 123/179.2 |
| 8,308,607 B2 | 11/2012 | Christen et al. | |
| 8,417,406 B2 | 4/2013 | Bichler et al. | |
| 2010/0076656 A1 * | 3/2010 | Hiyoshi | B60W 10/06 701/70 |
| 2010/0191446 A1 | 7/2010 | McDonald et al. | |
| 2010/0286883 A1 * | 11/2010 | Kato | B60K 6/445 701/70 |
| 2010/0320018 A1 * | 12/2010 | Gwozdek | B60T 17/18 180/65.27 |
| 2013/0151048 A1 | 6/2013 | Kwon et al. | |

FOREIGN PATENT DOCUMENTS

GB   2413999 B   8/2008
JP   2013001282 A   1/2013

* cited by examiner

*Primary Examiner* — Huan Le
(74) *Attorney, Agent, or Firm* — Carlson, Gaskey & Olds

(57) ABSTRACT

A method according to an exemplary aspect of the present disclosure includes, among other things, controlling an electrified vehicle by engaging a parking brake if a battery state of charge is depleted below a predefined threshold.

19 Claims, 4 Drawing Sheets

ELECTRIFIED VEHICLE NEUTRAL ENGINE START

TECHNICAL FIELD

This disclosure relates to an electrified vehicle, and more particularly, but not exclusively, to a vehicle system and method for permitting neutral engine starting of an electrified vehicle.

BACKGROUND

In general, electrified vehicles differ from conventional motor vehicles in that they are selectively driven by one or more battery powered electric machines. Conventional motor vehicles, by contrast, rely exclusively on an internal combustion engine to drive the vehicle. Electrified vehicles may use electric machines instead of, or in addition to, internal combustion engines. The electric machines are typically powered by high voltage batteries.

In some operating conditions, an electrified vehicle may be powered on and in neutral gear for an extended amount of time. When this occurs, the high voltage battery may be depleted to the point that it becomes necessary to shut down the vehicle.

SUMMARY

A method according to an exemplary aspect of the present disclosure includes, among other things, controlling an electrified vehicle by engaging a parking brake if a battery state of charge is depleted below a predefined threshold.

In a further non-limiting embodiment of the foregoing method, the method includes starting an engine of the electrified vehicle after the step of engaging the parking brake.

In a further non-limiting embodiment of either of the foregoing methods, the method includes disengaging the parking brake after the engine is started.

In a further non-limiting embodiment of any of the foregoing methods, the controlling step is performed if the electrified vehicle is keyed-on and in neutral.

In a further non-limiting embodiment of any of the foregoing methods, the controlling step is performed if an engine of the electrified vehicle is off.

In a further non-limiting embodiment of any of the foregoing methods, the controlling step is performed if the electrified vehicle is being operated at zero speed.

In a further non-limiting embodiment of any of the foregoing methods, the method includes confirming that the parking brake is engaged prior to requesting an engine crank.

In a further non-limiting embodiment of any of the foregoing methods, the method includes monitoring a torque being applied at the wheels of the electrified vehicle.

In a further non-limiting embodiment of any of the foregoing methods, the monitoring step includes assuming the electrified vehicle is in park and determining whether the torque being applied at the wheels is below a predefined threshold.

In a further non-limiting embodiment of any of the foregoing methods, the method includes performing a neutral engine start of the electrified vehicle if the torque being applied at the wheels is below the predefined threshold or preventing the neutral engine start if the torque being applied at the wheels is above the predefined threshold.

A method according to another exemplary aspect of the present disclosure includes, among other things, engaging a parking brake of an electrified vehicle and starting an engine of the electrified vehicle subsequent to the engaging step.

In a further non-limiting embodiment of the foregoing method, the engaging step is performed if the electrified vehicle is keyed-on, in neutral and the engine is off.

In a further non-limiting embodiment of either of the foregoing methods, the engaging step is performed if a state of charge of a battery of the electrified vehicle is depleted below a predefined threshold.

In a further non-limiting embodiment of any of the foregoing methods, the method includes communicating a neutral engine start message to an instrument panel of the electrified vehicle.

In a further non-limiting embodiment of any of the foregoing methods, the method includes monitoring a torque being applied at the wheels of the electrified vehicle between the engaging step and the starting step.

A vehicle system according to another exemplary aspect of the present disclosure includes, among other things, a parking brake, a battery and a controller configured to command engagement of the parking brake in response to a state of charge of the battery being depleted below a predefined threshold.

In a further non-limiting embodiment of the foregoing vehicle system, the parking brake is an electronic parking brake that includes an electronic control unit and an actuator.

In a further non-limiting embodiment of either of the foregoing vehicle systems, the controller or a second controller monitors the state of charge of the battery.

In a further non-limiting embodiment of any of the foregoing methods, the systems includes an engine, the controller is configured to command a neutral engine start after engaging the parking brake.

In a further non-limiting embodiment of any of the foregoing methods, the system includes an instrument panel configured to display a neutral engine start message.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system that provides neutral engine starting in electrified vehicles. The vehicle system engages a parking brake if a state of charge of a battery of the electrified vehicle is depleted below a predefined threshold. Momentary engagement of the parking brake permits the electrified vehicle to be started in neutral without a risk of unintended vehicle movement. These and other features are discussed in greater detail herein.

Figure 1:
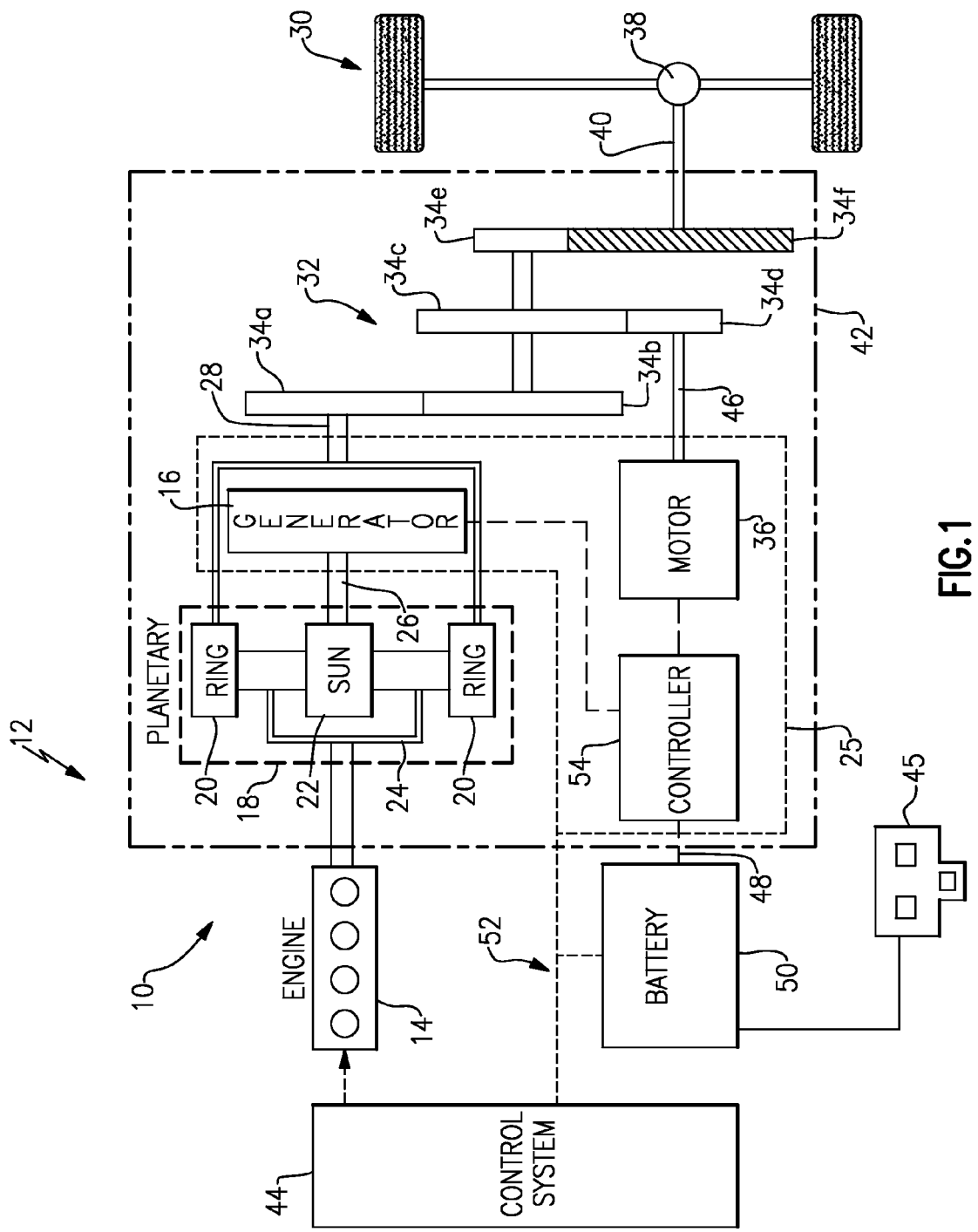
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and modular hybrid transmission vehicles.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50.

The battery 50 may be a high voltage battery that is capable of outputting electrical power to operate the motor 36 and the generator 16. Other types of energy storage devices and/or output devices can also be incorporated for use by the electrified vehicle 12. In a non-limiting PHEV embodiment of the electrified vehicle 12, the battery 50 may be recharged or partially recharged using a charging adapter 45 that is connected to a charging station powered by an external power source, such as an electrical grid, a solar panel, or the like.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

In one non-limiting embodiment, the electrified vehicle 12 has two basic operating modes. The electrified vehicle 12 may operate in an Electric Vehicle (EV) mode where the motor 36 is used (generally without assistance from the engine 14) for vehicle propulsion, thereby depleting the battery 50 state of charge up to its maximum allowable discharging rate under certain driving patterns/cycles. The EV mode is an example of a charge depleting mode of operation for the electrified vehicle 12. During EV mode, the state of charge of the battery 50 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 36 are both used for vehicle propulsion. The HEV mode is an example of a charge sustaining mode of operation for the electrified vehicle 12. During the HEV mode, the electrified vehicle 12 may reduce the motor 36 propulsion usage in order to maintain the state of charge of the battery 50 at a constant or approximately constant level by increasing the engine 14 propulsion usage. The electrified vehicle 12 may be operated in other operating modes in addition to the EV and HEV modes.

It may be desirable during some situations to start the engine 14 when the electrified vehicle 12 is in neutral and operating in EV mode. Exemplary vehicle systems and control strategies for achieving such a neutral engine start are described in greater detail below.

Figure 2:
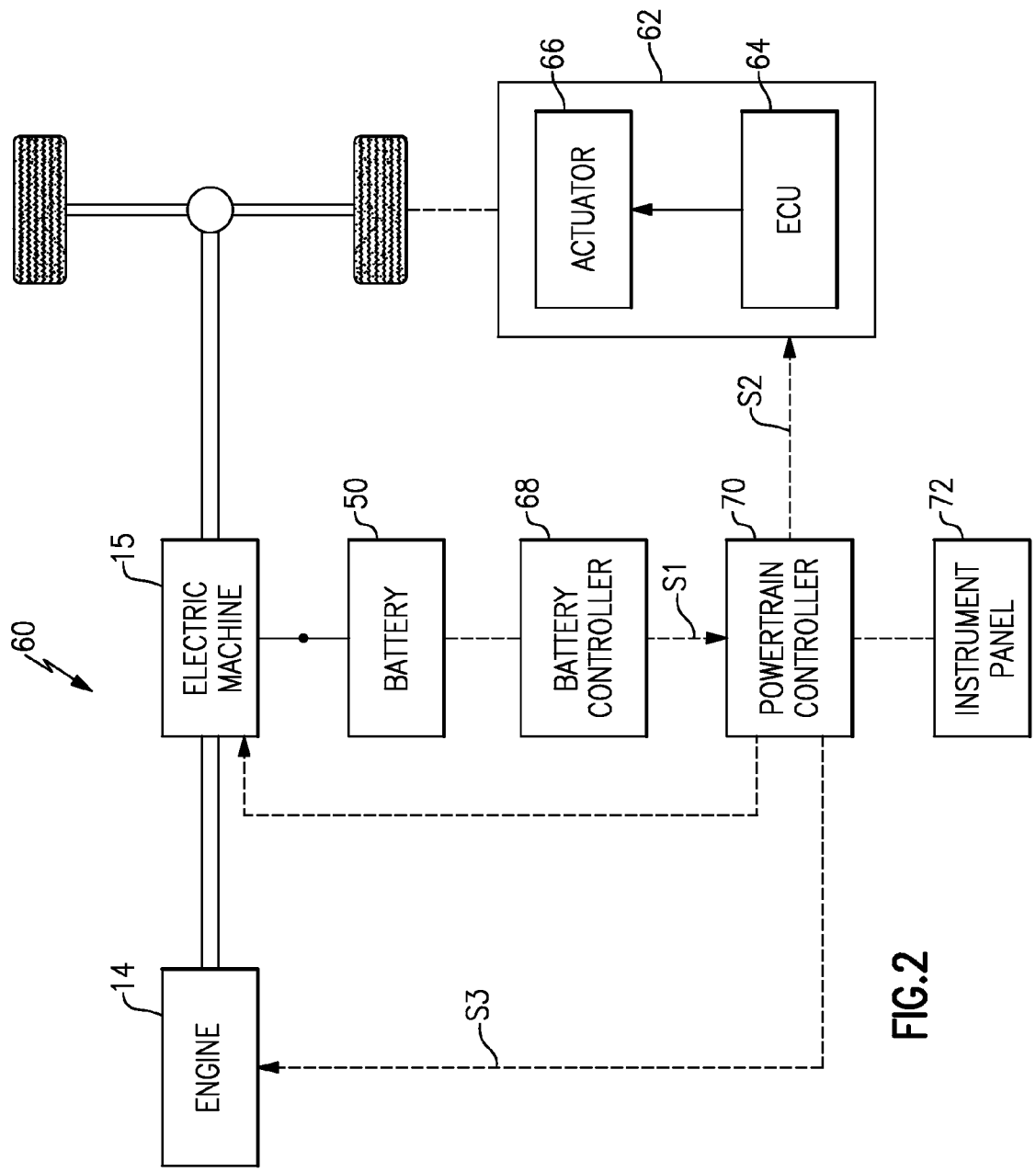
FIG. 2 illustrates a vehicle system of an electrified vehicle.

FIG. 2 schematically illustrates a vehicle system 60 that may be incorporated into an electrified vehicle, such as the electrified vehicle 12 of FIG. 1. The vehicle system 60 may be employed to control operation of an electrified vehicle, such as to provide neutral engine starting of an engine 14 of the vehicle. Just prior to a neutral engine start, the engine 14 is off, the vehicle is in neutral gear, and the vehicle is being powered solely by an electric machine 15 (e.g., a motor, a generator, or a combined motor/generator).

The exemplary vehicle system 60 includes a parking brake 62 that can be engaged to avoid unintended vehicle movement during a neutral engine start. In one non-limiting embodiment, the parking brake 62 is an electronic parking brake that includes an electronic control unit (ECU) 64 and an actuator 66. During certain operating conditions, such as when the vehicle is in neutral, the ECU 64 may command the actuator 66 to engage the parking brake 62 and thereby prevent the vehicle from rolling.

The vehicle system 60 may additionally include a battery controller 68 (i.e., a first controller) and a powertrain controller 70 (i.e., a second controller). Although shown as separate, stand-alone components, the battery controller 68 and the powertrain controller 70 could be part of a single control system. For example, the battery controller 68 and the powertrain controller 70 may be part of the control system 44 (see FIG. 1). In this embodiment, the battery controller 68, the powertrain controller 70, and the ECU 64 communicate with one another and/or with other controllers, modules and/or components over the CAN 52 (see FIG. 1).

The battery controller 68 and the powertrain controller 70 may communicate with one another to control operation of the vehicle system 60. In one embodiment, the battery controller 68 monitors the status of the battery 50. For example, among other operating parameters, the battery controller 68 may monitor the state of charge (SOC) of the battery 50.

The powertrain controller 70 may monitor and control multiple other aspects of the vehicle system 60. For example, the powertrain controller 70 can communicate with the ECU 64 to selectively command engagement of the parking brake 62, can command starting and operation of the engine 14, and can control operation of the electric machine 15. The battery controller 68 and the powertrain controller 70 may include the necessary hardware and/or software for executing a plurality of interrelated algorithms for controlling the vehicle system 60.

In one non-limiting neutral engine start embodiment (i.e., the engine 14 is off and the vehicle is operating in EV mode and is in neutral), the battery controller 68 may communicate a signal S1 to the powertrain controller 70 indicating that the SOC of the battery 50 is below a predefined threshold. The predefined threshold could be programmed at any threshold percentage amount. In response to receiving the signal S1, the powertrain controller 70 may communicate a signal S2 to the ECU 64 to command engagement of the parking brake 62 via the actuator 66. Engaging the parking brake 62 prevents unintended vehicle movement during a neutral engine start. Once the parking brake 62 has been engaged, the powertrain controller 70 may communicate another signal S3 to the engine 14 to command the engine on (i.e., to command engine crank) and begin HEV operation of the vehicle.

The vehicle system 60 may additionally include an instrument panel 72. Although shown schematically in FIG. 2, the instrument panel 72 is typically located within the vehicle passenger cabin for displaying vehicle information to a vehicle operator or driver. In one embodiment, the instrument panel 72 may display a neutral engine start message to the vehicle operator.

Figure 3:
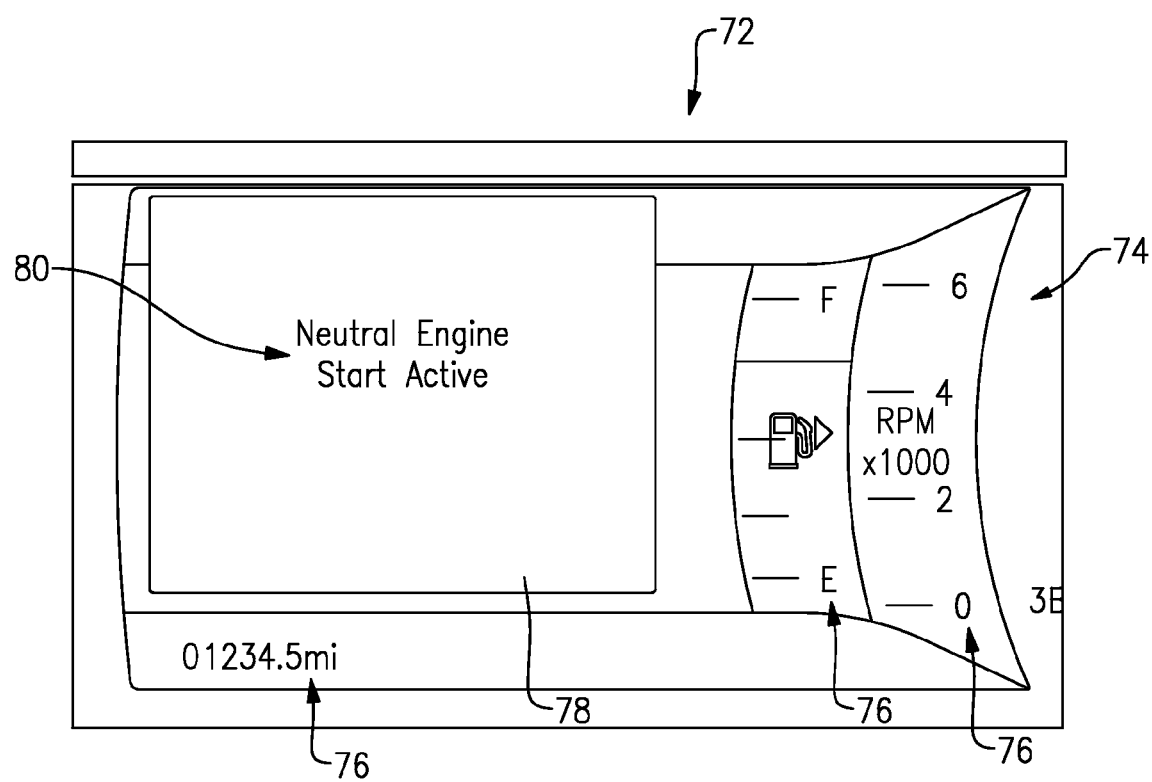
FIG. 3 illustrates an instrument panel of a vehicle system.

FIG. 3 illustrates one non-limiting embodiment of an exemplary instrument panel 72 of a vehicle system such as the vehicle system 60 of FIG. 2. The instrument panel 72 may include a display 74 that presents vehicle information to the vehicle operator. In one embodiment, the display 74 includes a multitude of indicators 76, such as a mileage indicator, a fuel indicator and a RPM indicator. Of course, various other indicators may additionally or alternatively be provided within the scope of this disclosure.

The display 74 may additionally include a message center 78. Various messages 80 can be presented to the vehicle operator on the message center 78. In this embodiment, a neutral engine start message is presented to the vehicle operator on the message center 78 to indicate that a neutral engine start is being performed.

Figure 4:
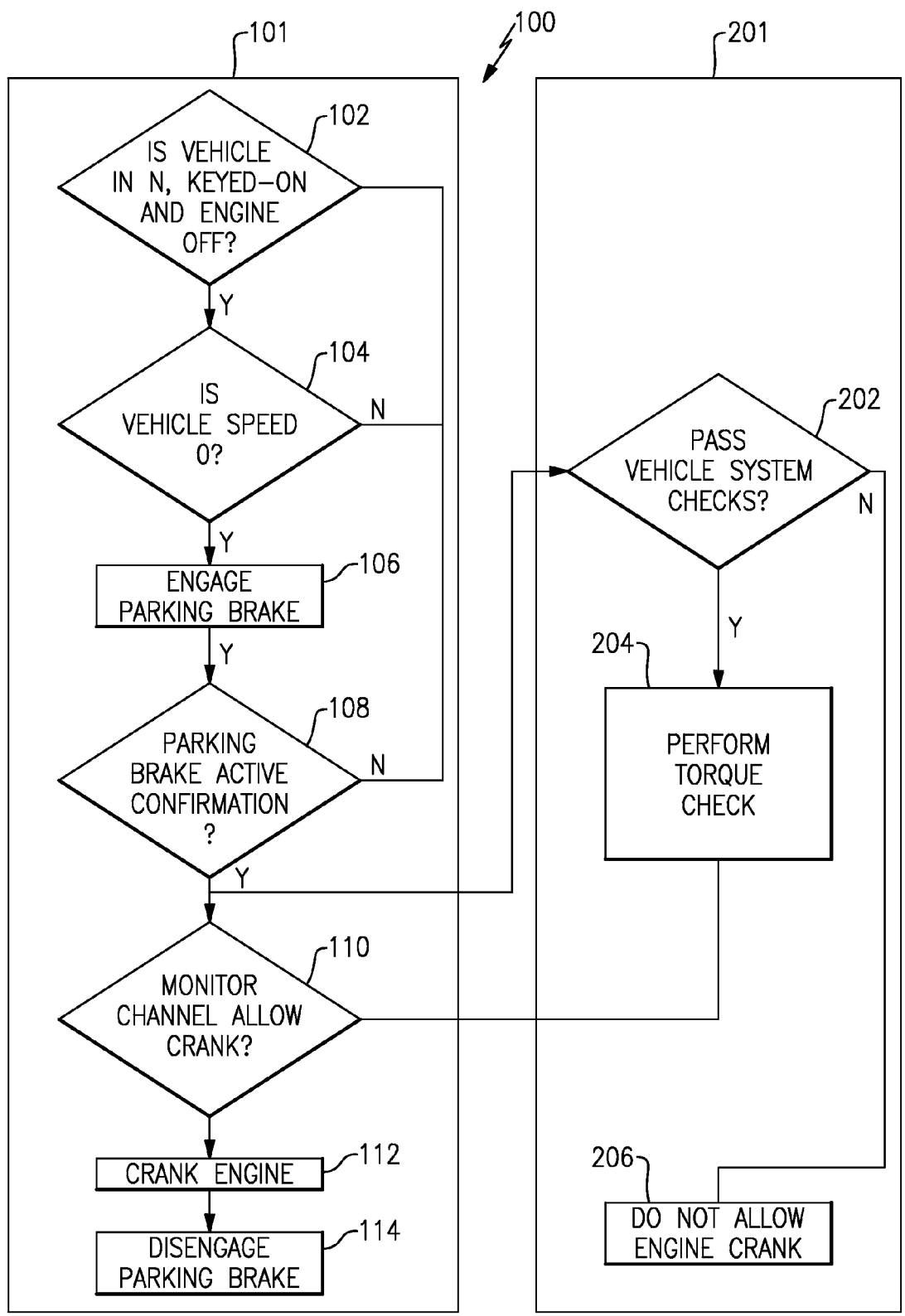
FIG. 4 schematically illustrates a vehicle control strategy for controlling an electrified vehicle.

FIG. 4, with continued reference to FIGS. 1-3, schematically illustrates a vehicle control strategy 100 for performing a neutral engine start by employing the vehicle system 60 described above. Of course, the vehicle system 60 is capable of implementing and executing other control strategies within the scope of this disclosure. In one embodiment, the battery controller 68 and the powertrain controller 70 of the vehicle system 60 may be programmed to employ one or more algorithms for executing the exemplary vehicle control strategy 100, or any other control strategy.

In one embodiment, the vehicle control strategy 100 includes a control channel 101 and a torque monitor channel 201. Both of these channels, including their various control sequences, are discussed in detail below.

The exemplary vehicle control strategy 100 begins at block 102 of the control channel 101. At block 102, the vehicle system 60 determines whether the vehicle is keyed-on, in neutral, and that the engine 14 is turned off. In other words, the vehicle system 60 determines whether the vehicle is being operated in EV mode and is in neutral gear. In one embodiment, a neutral engine start is performed only if these conditions exist and are confirmed by the powertrain controller 70 or some other controller(s).

If the vehicle is in neutral, keyed-on, and the engine 14 is off, the control strategy 100 may proceed to block 104 by determining whether the vehicle is operating at zero speed. If so, the parking brake 62 is engaged at block 106. In one embodiment, the parking brake 62 is engaged only if the battery controller 68 determines that the SOC of the battery 50 has been depleted below a predefined threshold. If the vehicle is not operating at zero speed or the battery SOC is not below a certain threshold, the vehicle control strategy 100 returns to block 102.

Next, at block 108, the vehicle system 60 confirms whether or not the parking brake 62 has been engaged. If no, the vehicle control strategy 100 returns to block 102. If engagement of the parking brake 62 is confirmed at block 108, the vehicle control strategy 100 may proceed to the torque monitor channel 201.

The torque monitor channel 201 sequence begins execution at block 202. Here, various vehicle system checks may be performed. For example, by way of non-limiting examples, the vehicle system 60 may confirm that the shifter of the vehicle is in neutral, that the vehicle is stationary, that the parking brake 62 is active, and/or that no vehicle health faults have been detected. If any vehicle system check returns a failure, the vehicle control strategy 100 proceeds to block 206 and prevents the engine 14 from being cranked. In other words, the neutral engine start sequence is cancelled.

If each vehicle system check passes at block 202, the vehicle control strategy 100 may proceed to block 204 of the torque monitor channel 201. Here, a torque check may be performed on the vehicle. In one embodiment, as part of the torque check, the vehicle system 60 assumes that the vehicle is in park and monitors the torque being applied by various actuators at the wheels of the vehicle. If the torque check of block 204 confirms that the various torques are within a predefined threshold, the vehicle control strategy 100 returns to the control channel 101.

At block 110 of the control channel 101, the vehicle system 60 confirms whether or not the torque monitor channel 201 has determined that an engine crank is permissible. If confirmation is made at block 110, the engine 14 is cranked to start the engine with the vehicle in neutral at block 112.

In one embodiment, the parking brake 62 is only momentarily engaged at block 106. For example, subsequent to starting the engine 14 at block 112, the parking brake 62 may be automatically disengaged at block 114. Block 114 may be commanded after a predefined threshold amount of time has passed since the engine 14 was started at block 112.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling an electrified vehicle by automatically engaging an electronic parking brake if a battery state of charge is depleted below a predefined threshold and the electrified vehicle is in a neutral gear.

2. The method as recited in claim 1, comprising starting an engine of the electrified vehicle after engaging the electronic parking brake.

3. The method as recited in claim 2, comprising disengaging the electronic parking brake after the engine is started.

4. The method as recited in claim 1, wherein controlling the electrified vehicle is performed if an engine of the electrified vehicle is off.

5. The method as recited in claim 1, wherein controlling the electrified vehicle is performed if the electrified vehicle is being operated at a zero forward or reverse speed.

6. The method as recited in claim 1, comprising confirming that the electronic parking brake is engaged prior to requesting an engine crank.

7. The method as recited in claim 1, comprising monitoring a torque being applied to wheels of the electrified vehicle.

8. The method as recited in claim 1, comprising performing a neutral engine start if a wheel torque of the electrified vehicle is below a predefined threshold.

9. The method as recited in claim 8, comprising automatically disengaging the electronic parking brake after performing the neutral engine start.

10. The method as recited in claim 8, comprising performing various vehicle system checks prior to performing the neutral engine start.

11. The method as recited in claim 10, comprising preventing the neutral engine start if any vehicle system returns a failure.

12. A method, comprising:
controlling an electrified vehicle by engaging a parking brake if a battery state of charge is depleted below a predefined threshold; and
monitoring a torque being applied to wheels of the electrified vehicle, wherein monitoring the torque includes assuming the electrified vehicle is in park and determining whether the torque being applied at the wheels is below a predefined threshold.

13. The method as recited in claim 12, comprising:
performing a neutral engine start of the electrified vehicle if the torque being applied at the wheels is below the predefined threshold; or
preventing the neutral engine start if the torque being applied at the wheels is above the predefined threshold.

14. A method, comprising:
electronically engaging a parking brake of an electrified vehicle if the electrified vehicle is in neutral and a state of charge of a battery of the electrified vehicle is depleted below a predefined threshold; and
automatically starting an engine of the electrified vehicle subsequent to engaging the parking brake if an amount of torque applied to a wheel of the electrified vehicle is below a predefined threshold.

15. The method as recited in claim 14, comprising communicating a neutral engine start message to an instrument panel of the electrified vehicle.

16. A vehicle system, comprising:
a parking brake;
a battery;
an engine; and
a controller configured to command engagement of said parking brake in response to a state of charge of said battery being depleted below a predefined threshold and configured to command a neutral engine start of said engine after engaging said parking brake if a wheel torque is below another predefined threshold.

17. The vehicle system as recited in claim 16, wherein said parking brake is an electronic parking brake that includes an electronic control unit and an actuator.

18. The vehicle system as recited in claim 16, wherein said controller or a second controller monitors said state of charge of said battery.

19. The vehicle system as recited in claim 16, comprising an instrument panel configured to display a neutral engine start message.

* * * * *